(12) United States Patent
Bar-Kovetz et al.

(10) Patent No.: US 7,835,356 B2
(45) Date of Patent: Nov. 16, 2010

(54) METHOD AND DEVICE FOR FRAGMENTED PACKET ROUTING IN VIRTUALIZED ENVIRONMENTS

(75) Inventors: Sion Bar-Kovetz, Nesher (IL); Alexander Greenberg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 11/984,252

(22) Filed: Nov. 15, 2007

(65) Prior Publication Data

US 2009/0129394 A1 May 21, 2009

(51) Int. Cl.
*H04L 12/28* (2006.01)
*H04L 12/56* (2006.01)
*H04J 3/24* (2006.01)

(52) U.S. Cl. .................. 370/389; 370/395.32; 370/474

(58) Field of Classification Search ........................ None
See application file for complete search history.

(56) References Cited

U.S. PATENT DOCUMENTS

| 6,643,653 | B1 * | 11/2003 | Chu ............................. 707/10 |
| 6,754,662 | B1 * | 6/2004 | Li ............................... 707/101 |
| 2005/0100034 | A1 * | 5/2005 | Basso et al. ................. 370/412 |
| 2005/0286517 | A1 * | 12/2005 | Babbar et al. ............... 370/389 |

* cited by examiner

*Primary Examiner*—Chirag G Shah
*Assistant Examiner*—Srinivasa R Reddivalam
(74) *Attorney, Agent, or Firm*—Pearl Cohen Zedek Latzer, LLP

(57) ABSTRACT

A method and device for routing fragmented data frames is provided. A data frame may be fragmented into a plurality of fragments, each fragment including a packet identifier and a fragment offset. The first fragment may further include a port number associated with a target partition of a plurality of partitions. If the fragment is a first fragment as determined from the fragment offset, the packet identifier and target partition is stored at a location in a hash table, the location calculated by using the packet identifier of the fragment as a hash key. Other embodiments are described and claimed.

9 Claims, 5 Drawing Sheets

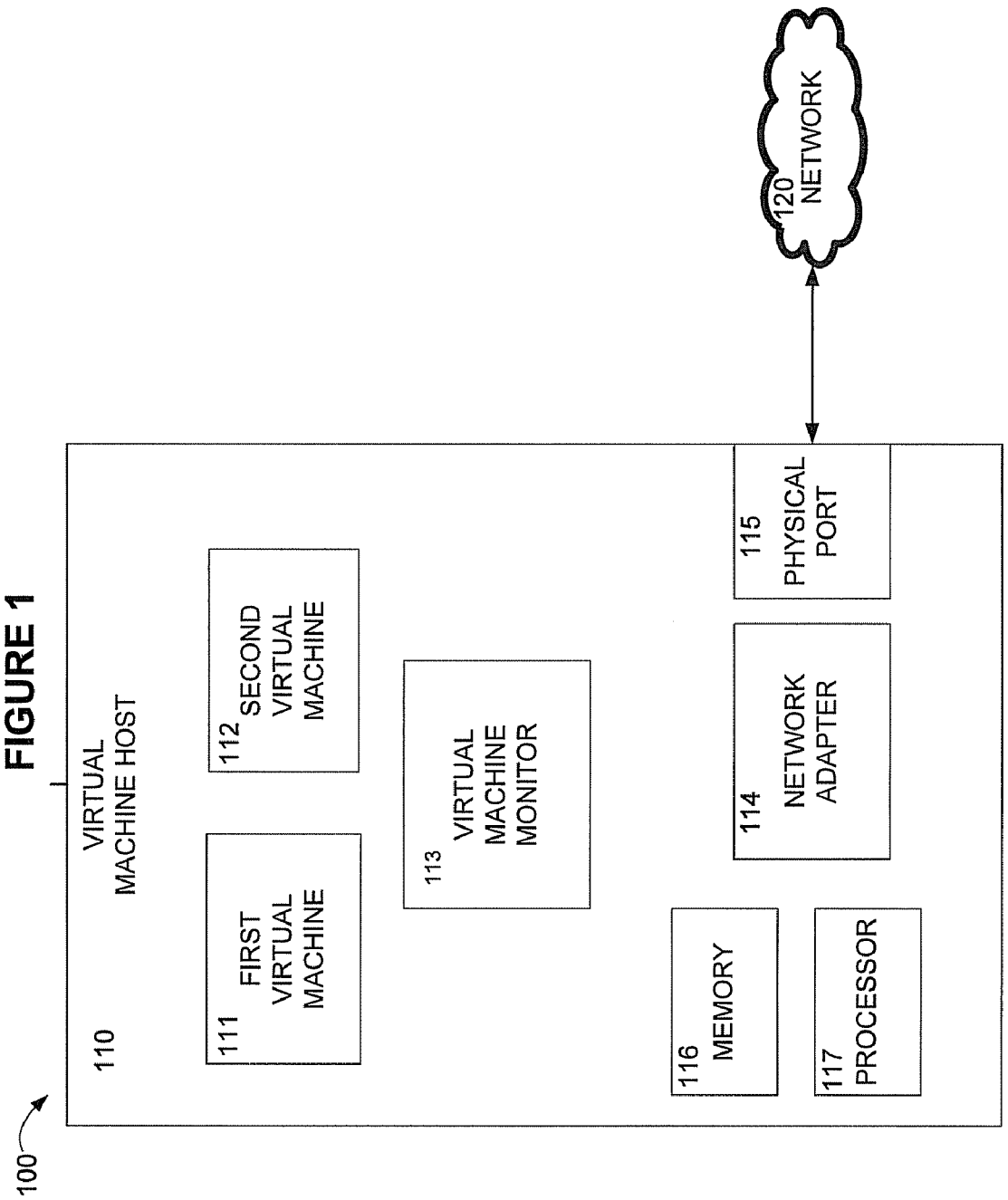

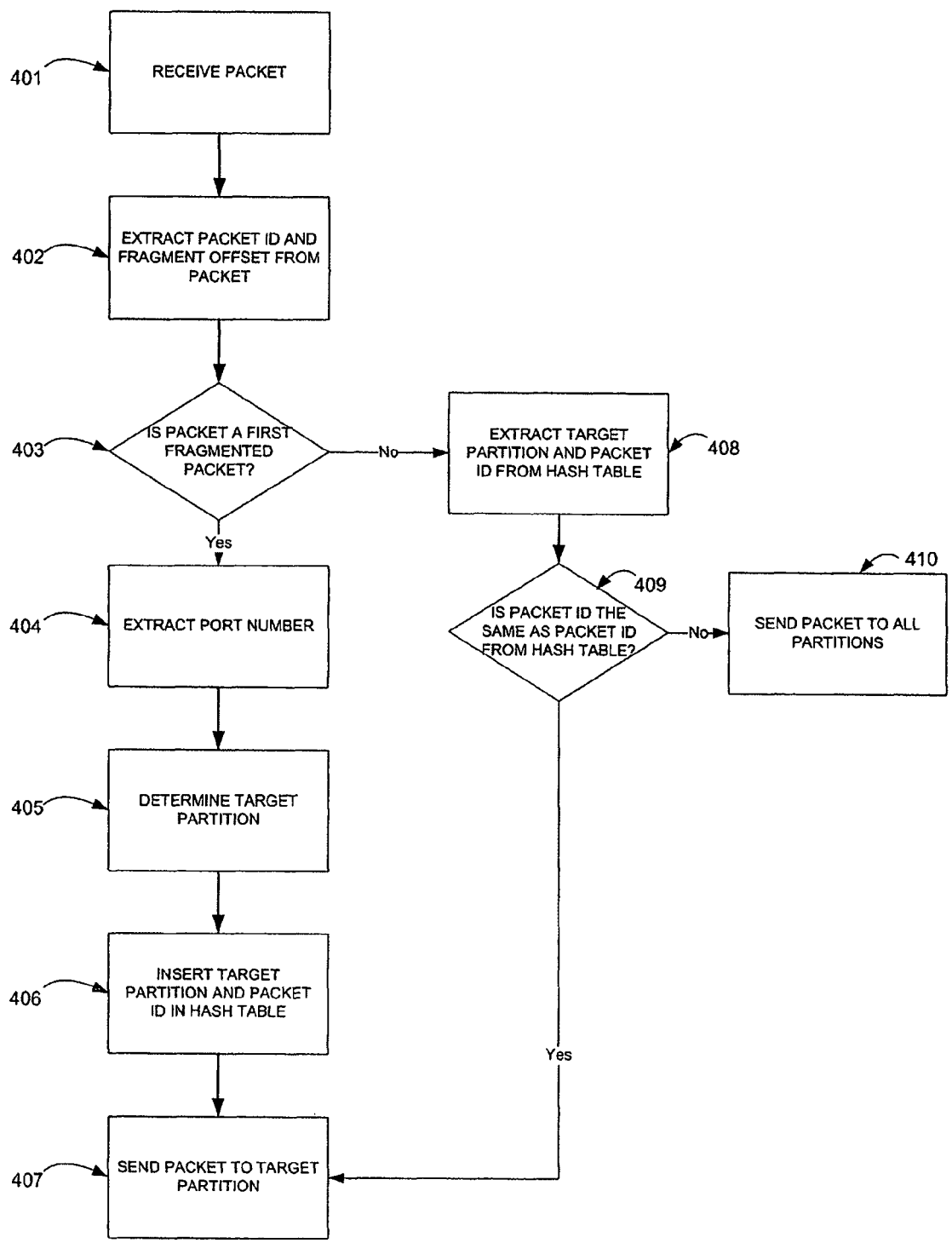

METHOD AND DEVICE FOR FRAGMENTED PACKET ROUTING IN VIRTUALIZED ENVIRONMENTS

BACKGROUND OF THE INVENTION

A virtual machine (VM) may be or include a framework or environment created by for example a virtual machine monitor (VMM) on a host system. In some instances, a host system may host two or more VMs operating simultaneously. These VMs each may receive data packets from one or more other entities linked to the host computing platform by a network connection.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 1 is a schematic illustration of a virtual machine host according to an embodiment of the invention.

FIG. 4 is a flowchart of a method for fragmented packet routing according to an embodiment of the invention.

Figure 2A:
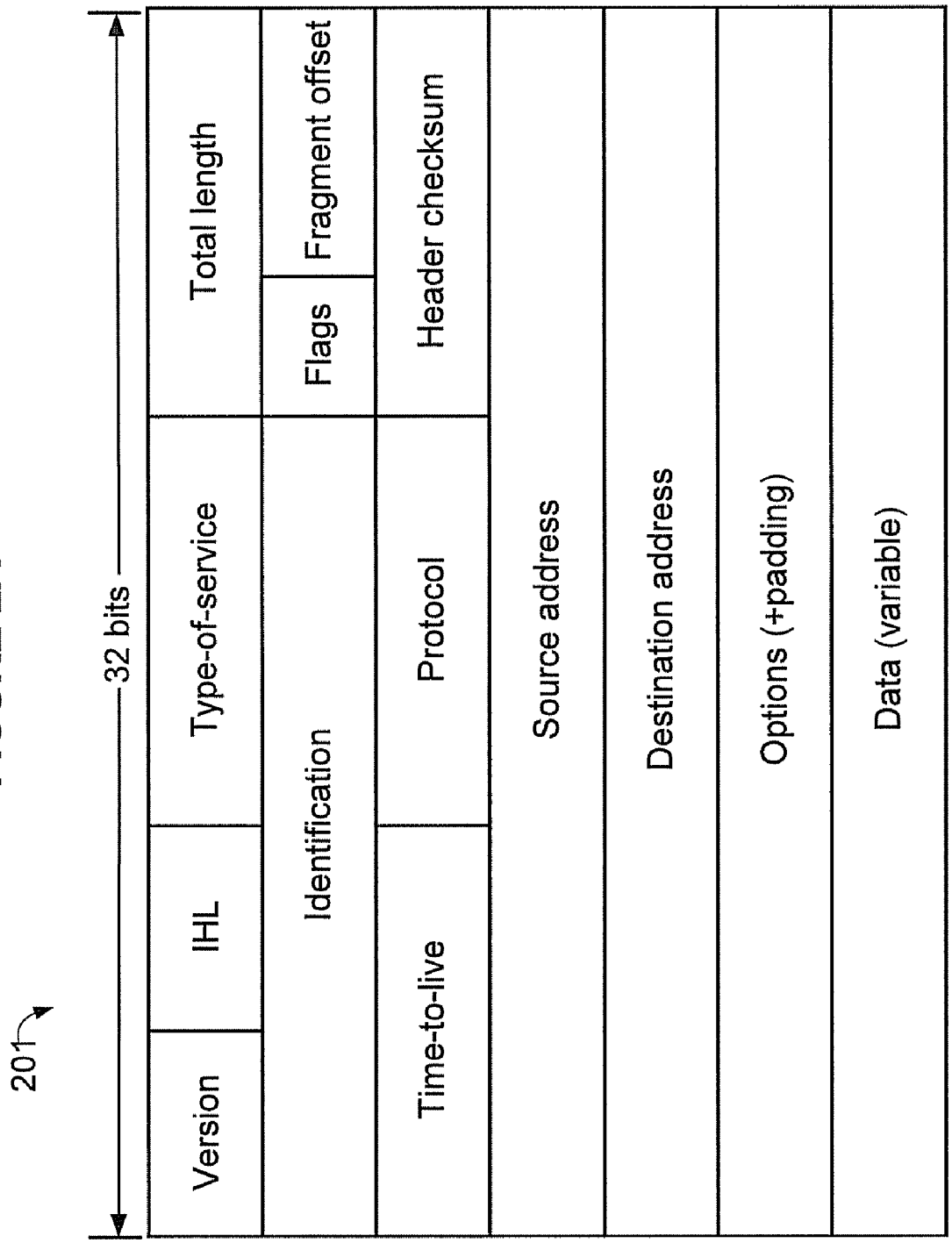
FIGS. 2A and 2B are representative illustrations of a data frame format and a data packet format according to an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may provide a method and system for fragmented packet routing in virtualized environments. In one embodiment, a fragment of a data frame fragmented into a plurality of fragments may be received, every fragment including at least a header and the header including at least a packet identifier and a fragment offset. The first fragment of the plurality of fragments may further include at least a port number that may be associated with a target partition of a plurality of partitions. A hash key for a location in a hash table may be calculated from the packet identifier of the fragment. The fragment offset may be used to determine if the fragment is a first fragment. If the fragment is the first fragment of the fragmented data frame, the packet identifier and the target partition may be stored at the location in the hash table. If the fragment is not the first fragment, the packet identifier and target partition may be retrieved from the location in the hash table.

Reference is now made to FIG. 1, a schematic illustration of a VM host and network system 100 capable of implementing fragmented packet routing in a virtualized environment according to an embodiment of the invention. Although the invention is not limited in this respect, VM host and network system 100 may include a VM host 110 that may be connected to network 120. In some embodiments, VM host 110 may include or may be, for example, a personal computer, a desktop computer, a mobile computer, a laptop computer, a notebook computer, a terminal, a workstation, a server computer, a personal digital assistant (PDA) device, a network device, or other suitable computing device capable of hosting one or more VMs.

VM host 110 may include for example a virtual machine monitor (VMM) 113, a first VM 111, a second VM 112 (while only two VMs are shown, more may be used), a network adapter 114, a physical port 115, a memory unit 116, and a processor 117 in accordance with embodiments of the invention. VM host 110 may be connected to and may receive data packets from network 120.

VM 111 may include, for example, one or more environments able to emulate, simulate, virtualize, execute, directly execute, or invoke a hardware component, a software component, an operating system (OS), an application, a code, a set of instructions, or the like. VM 111 may be implemented using hardware components and/or software components. For example, VM 111 may be implemented as a software application executed in a component of or in VM host 110 or as a hardware component integrated within VM host 110 or as a hardware component of some other hardware component of VM host 110. In some embodiments VM 111 may simulate one or more components of a computing platform that may receive data packets from a network, another network entity, or other computing device either virtualized or not. VM 111 may have associated uniquely with it one or more port numbers as known in the art that may uniquely identify or distinguish VM 111 from other virtual entities in VM host 110 such as for example VM 112.

In some embodiments VM 111 may be capable of receiving and processing data packets and routing or directing them to their intended destinations such as for example VM 111 or VM 112 according to a method of the invention. VM 111 may extract information from a received packet and based on that information, make a determination as to the intended destination of the packet, and route the packet to that destination. Furthermore, VM 111 may extract and store additional information from a received packet that may be a first fragmented packet, e.g. fragment, of a fragmented data frame and use this information in routing subsequent fragmented packets of the fragmented data frame.

VM 112 may also include, for example, one or more environments able to emulate, simulate, virtualize, execute, directly execute, or invoke a hardware component, a software component, an operating system (OS), an application, a code, a set of instructions, or the like. VM 112 may be implemented using hardware components and/or software components. For example, VM 112 may be implemented as a software application executed in a component of or in VM host 110 or as a hardware component integrated within VM host 110 or as a hardware component of some other hardware component of VM host 110. VM 112 may have associated uniquely with it one or more port numbers as known in the art that may uniquely identify or distinguish VM 112 from other virtual entities in VM host 110 such as for example VM 111. In some embodiments VM 112 may simulate one or more components of a computing platform that may receive data packets from a network such as for example network 120, another network entity, or other computing device either virtualized or not. However, data destined for VM 112 may be first processed by VM 111 before being forwarded to VM 112.

Although FIG. 1 shows a single VM 112 component, the present invention is not limited in this regard, and VM host 110 may be capable of hosting a plurality of VM 112's which along with VM 111, in some embodiments, may operate substantially in parallel. If more than one VM 112 is present, each may be uniquely associated with one or more port numbers.

VMM 113 may create and manage a plurality of VM's such as for example VM 111 and VM 112 and allocate resources within for example VM host 110 to support one or more VMs. VMM 113 may be implemented using hardware components and/or software components. For example, VMM 113 may be implemented as a software application executed in a component of or in VM host 110 or as a hardware component integrated within VM host 110 or as a hardware component of some other hardware component of VM host 110. VMM 113 may also be referred to for example as virtualization software, a hypervisor, or an I/O partition depending on the virtualization architecture or models. Correspondingly, a VM such as VM 111 or VM 112 may also be referred to as a partition or virtualized entity.

VMM 113 may include for example one or more software and/or hardware components able to create a VM such as for example VM 111 or VM 112, set or modify a property of a VM, configure a VM, monitor the operation of a VM, and/or control the operation of a VM. In some embodiments, VMM 113 may have, for example, system-level privileges, administrator-level privileges, and/or root-level privileges, and may control the operation of VM 111, VM 112, and/or other components of VM host 110 such as for example network adapter 114. VMM 113 may be able to use, directly and/or indirectly, one or more resources or components of VM host 110 such as for example network adapter 114.

Network adapter 114 may operate as a physical layer (e.g., Open System Interconnection (OSI) layer 1) and a data layer (e.g., OSI layer 2) component providing a physical access networking medium and low-level addressing such as for example through port numbers or MAC addresses. Network adapter 114 may be implemented as a software application executed in a component of or in VM host 110 or a hardware component integrated within VM host 110 or as a hardware component of some other hardware component of VM host 110. In some embodiments, network adapter 114 may also be implemented as for example an intelligent network adapter and may include a processor and memory. Network adapter 114 may for example be virtualized. In some embodiments, network adapter 114 may operate using for example Ethernet technology and may utilize MAC addressing in accordance with one or more IEEE standards. One or more other appropriate standards and technology may also be used.

Network adapter 114 may communicate with devices external to VM host 110 via for example physical port 115. Physical port 115 may be a component of VM host 110 that may act as an interface between VM host 110 and any external device or network. In some embodiments, physical port 115 may be an internal component of network adapter 114.

In some embodiments, VM 111 and/or VM 112 may receive data packets from other computing platforms or network entities outside of VM host 110. In these instances, VM 111 may receive packets from these network entities through network adapter 114. For such network communications, each instance of a VM may be associated with one or more port numbers. The number of port numbers may be equal to the number of VMs assigned to network adapter 114. Alternatively, the number of port numbers may exceed the number of VMs and may be very large, for example 65,535. Although each port must have an assigned destination associated with it, a VM may not be necessarily associated with any ports. One or more VMs may also have more than one associated port number.

Although FIG. 1 shows VMM 113, VM 111, and VM 112 and network adapter 114 as separate components of VM host 110, the present invention is not limited in this regard. VMM 113, VM 111, VM 112, and network adapter 114 may be implemented, for example, as software components stored within memory 116 of VM host 110, as a controller and/or processors and/or hardware units integrated within or coupled to one or more processors such as processor 117 within VM host 110, or the like. In some embodiments, operations discussed herein may for example be performed by a controller or processor such as processor 117.

Memory 116 may include, for example, one or more memories such as a random access memory (RAM), a read only memory (ROM), a dynamic RAM (DRAM), a synchronous DRAM (SD-RAM), a Flash memory, a volatile memory, a non-volatile memory, a cache memory, a buffer, a short term memory unit, a long term memory unit, or other suitable memory units for storing data and or software components such as VM 111, VMM 113, and/or network adapter 114. Memory 116 may also be capable of storing a hash table or other such data structure for access by for example VM 111.

Processor 117 may be or include for example one or more units such as central processing unit (CPU), a digital signal processor (DSP), a microprocessor, a controller, a chip, a microchip, or any suitable multi-purpose or specific processor or controller. In some embodiments, for example, processor 111 may perform calculation operations or processing operations which may be used in the operation of VM 111, VM 112, VMM 113, and/or network adapter 114.

In some embodiments, network adapter 114 may be connected to network 120. Network 120 may be a local area network (LAN), metropolitan area network (MAN), wide area network (WAN) or other similar network with communications links between two or more network nodes or stations such as for example VM 111 or VM host 110.

Reference is now made to FIG. 2A which shows a data frame 201 according to an embodiment of the invention which may be used by system 100 for sending data over network 120 to VM host 110. In some embodiments, a data frame in the format of data frame 201 may be an internet protocol (IP) data frame and may include for example an identifier, fragment offset, a source address (SA), destination address (DA), and a payload such as for example a data packet in accordance with RFC 791 or other such standard, although the invention is not limited in this respect. In some embodiments, one or more additional protocols may be used to transport the data such as for example a transmission control protocol (TCP). Alternatively, a user datagram protocol (UDP) may also be included. Other protocols may also be used, and data frames may include other components.

Figure 2B:
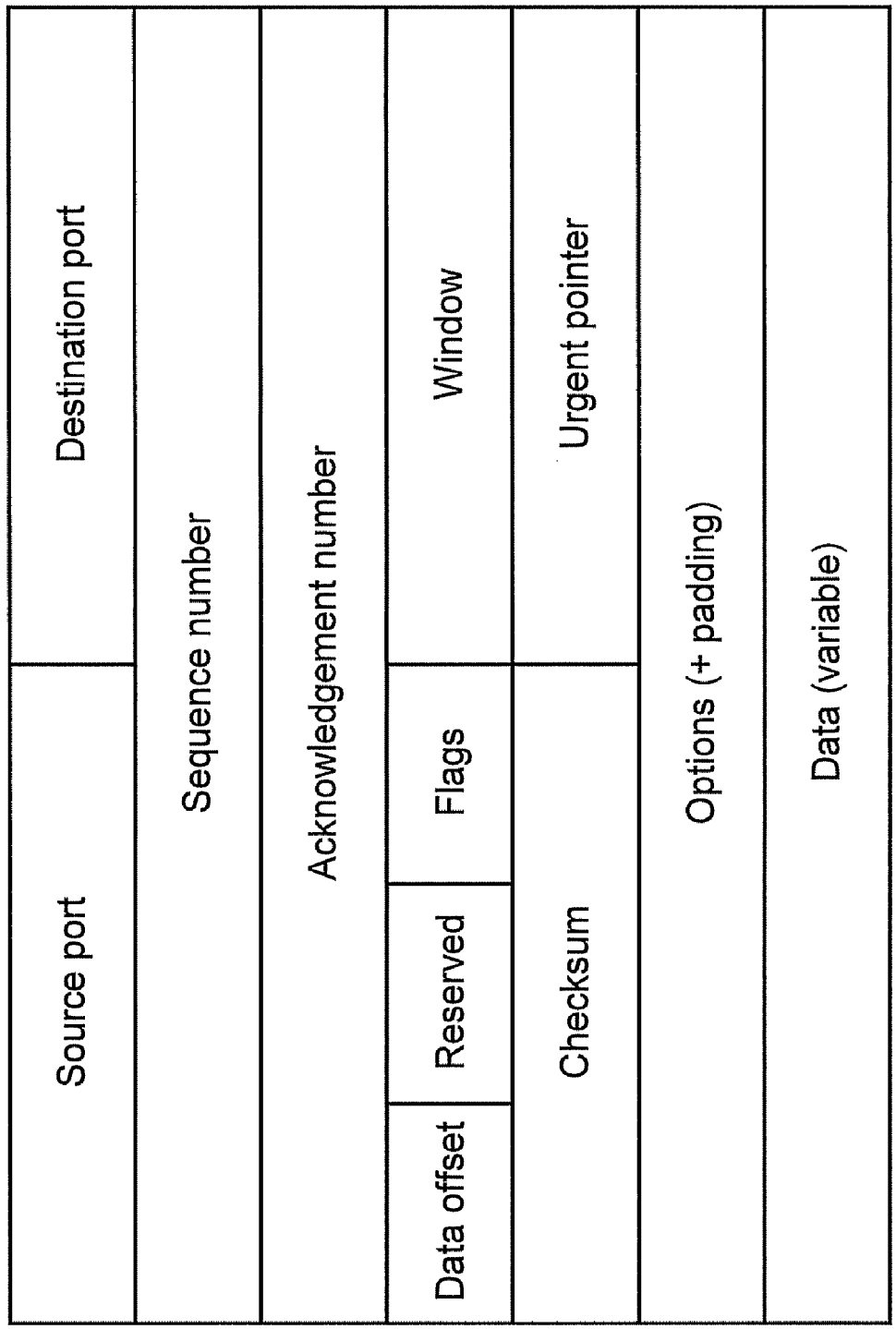

Reference is now made to FIG. 2B which shows a TCP data packet 202 according to an embodiment of the invention. In some embodiments, data packet 202 may include at least a source port, a destination port, a sequence number, and a payload in accordance with RFC 793 (TRANSMISSION CONTROL PROTOCOL DARPA INTERNET PROGRAM PROTOCOL SPECIFICATION, September 1981) or other such standard, although the invention is not limited in this respect. In some embodiments of the present invention, the destination port of a TCP or similar formatted data packet may be used by for example VM host 110 to route packets to their intended destination such as for example VM 111, VM 112 or other virtualized entity or partition. VM host 110 or a subunit of VM host 110 such as for example VMM 113 may assign one or more ports or port numbers exclusively or uniquely to each virtualized entity such that no one port is associated with more than one virtualized entity. Thus, when a TCP or similar packet having a destination port is received at VM host 110 and processed by for example VM 111, VM 111 may determine the virtual entity associated with the port and route the packet accordingly.

In some embodiments, the length of an IP data frame and possibly a corresponding TCP data packet may vary according to the amount of data in the payload. A network such as for example network 120 on which the data frame is carried may have a maximum transmission unit size (MTU) which may be the size of the largest packet which may be transmitted on that network. If a packet is larger than the allowable MTU, it may be divided into multiple smaller packets or fragments. Although the first fragmented packet, e.g. fragment, may contain the TCP header or another type of header, the second and subsequent fragmented packets of the data frame may only contain the IP header. As used herein, a first fragment may be the first packet in the sequence of packets that may result from fragmenting a data frame. In some embodiments, a first fragment may be recognized as having a fragment offset of zero. Other techniques for recognizing a first fragment may also be used.

For these instances wherein the destination port may not be present in the fragmented packet, various methods may properly route these fragmented packets to their intended destinations in VM host 110. In one technique, all of the packets of a fragmented data frame are collected as they arrive at VM host 110. Once all of the packets have arrived, the data frame may be reassembled and routed to the intended destination. This technique may require additional memory to store the fragmented packets and may delay the delivery of packets. Furthermore, in the event that one or more packets are lost, the entire frame must be resent. In another technique, all packets other than the first fragmented packet (which includes the destination port) may be routed to all possible entities on VM host 110. This technique may create extra traffic internal to VM host 110 and may slow down the operations of the virtualized entities on VM host 110 that are not the intended destination by requiring them to process unneeded packets.

Figure 3:
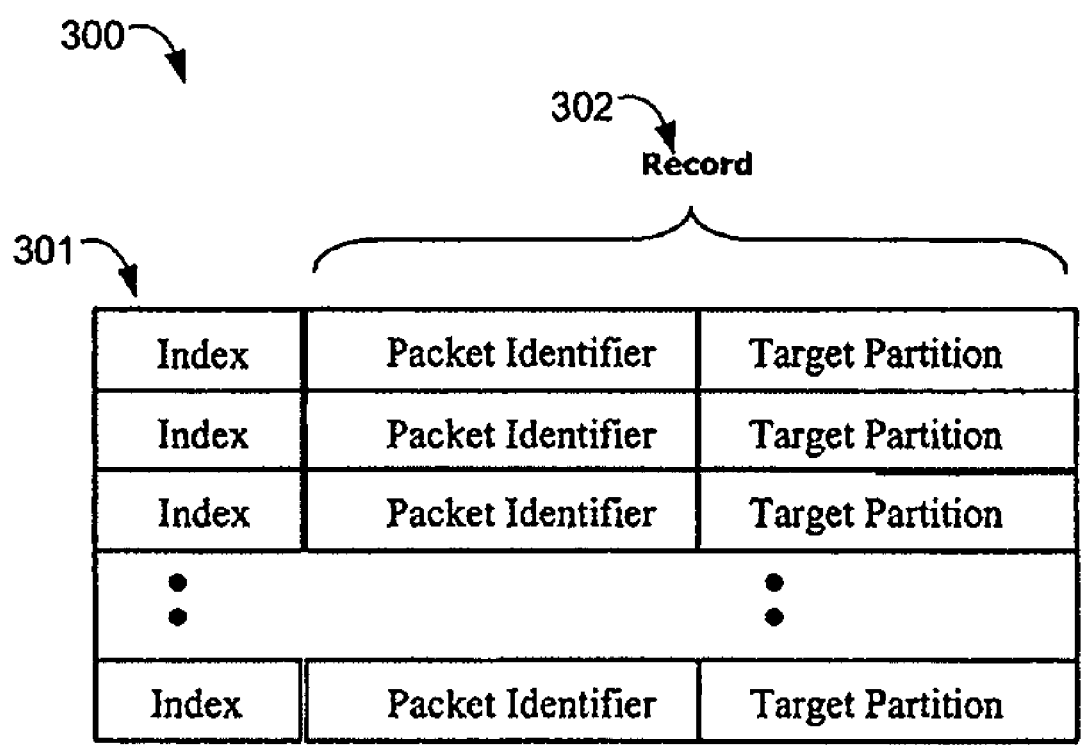
FIG. 3 is a representative illustration of a hash table according to an embodiment of the invention.

Some embodiments of the present invention may overcome these problems by routing fragmented packets as they arrive and sending them only to their intended destination when possible. The routing of fragmented packets that do not contain the destination port may be accomplished by associating the packet identifier which may remain the same for all packets of a fragmented data frame with the port number and corresponding virtual entity on VM host 110. When a packet arrives at VM 111 on VM host 110, its fragment offset or position in the data frame is extracted to determine if the packet is a first packet of a fragmented data frame. If the packet is a first fragment, e.g. the fragment offset or position may be zero, the packet identifier is stored in a data structure such as for example lookup or hash table 300 of FIG. 3.

In some embodiments, hash or lookup table 300 may be or include a tabular array of records 302 with each record associated with an index 301 or location number. In some embodiments, each record of table 300 may include two entries—a packet identifier and a target partition, e.g. a virtualized entity such as VM 111 or VM 112 on VM host 110. Although the invention is not limited in this respect, each record 302 may be accessed by a table lookup of index 301 or other technique as known in the art. Further, index 301 may be calculated by transforming a number, e.g. a hash key such as for example the packet identifier using a hash function or other such algorithm as known in the art. For example, the hash function may be the packet identifier modulo the number of records 302 in the hash table. Other structures for a hash or lookup table may be used, and hash functions or transformation functions may also be used.

Associating and storing the packet identifier and target partition with the packet identifier may allow VM 111 to route other packets without the TCP header by looking up the appropriate destination in the hash table based on the packet identifier. Storing the packet identifier may assure that the hash function performs an accurate translation by allowing VM 111 to compare the incoming packet's identifier with the stored identifier. If there is a mismatch, then the packet may be sent to all virtual entities on VM host 100.

Reference is now made to FIG. 4 which is a flowchart of a method for routing fragmented packets to virtualized entities according to an embodiment of the invention. Embodiments of the method may be used by, or may be implemented by, for example, VM host and network system 100 of FIG. 1 or by other suitable wired and/or wireless communication devices, stations, nodes, systems and/or networks. Embodiments of the method may also use the frame format and TCP packet of FIG. 2 and hash table structure of FIG. 3 or other suitable data frame formats and data structures.

As indicated at operation 401, a VM host such as VM host 110 may receive a data packet at for example network adapter 114 and may forward it internally to for example VM 111 to be processed. VM 111 may perform in operation 402 an extraction of the packet identifier (ID) and fragment offset from the packet. In operation 403 VM 111 may determine if the packet is a first fragmented packet of a data frame formatted for example as in the format of FIG. 2A with for example a TCP header of FIG. 2B. In some embodiments, VM 111 may determine whether the packet is a first fragment by analyzing the fragment offset: if the fragment offset is for example equal to zero, then the packet maybe a first fragment. Other methods for determining whether a packet is a first fragment may also be used.

If the packet is a first fragment, then VM 111 may extract the port number from the packet's TCP or other header (operation 404). VM 111 may then determine what partition or virtualized entity is associated with the port number, thereby determining what virtual entity such as for example VM 111 or VM 112 is the target partition, e.g. the intended destination of the packet. Using for example a hash function, VM 111 may calculate an index or lookup for a hash table such as index 301 in hash table 300 of FIG. 3 and insert the target partition and packet ID into a record of the hash table such as record 302 (operation 406). In operation 407, VM 111 may send the packet to its intended destination, e.g. the target partition.

If in operation 403 it is determined that the packet is not a first fragment, then an index in the hash table may be calculated using the extracted packet ID in a hash function. The entries for a target partition and packet ID in the record corresponding to the calculated index may then be extracted from the hash table (operation 408).

VM 111 may compare the packet ID extracted from the hash table with the packet ID of the received packet in operation 409. This comparison may assure that the result of the hash function calculation is the correct index, e.g. the one corresponding to the packet ID of the first fragmented packet. In some instances such as for example for fragmented packet from a different data frame or second fragment received before a first fragment, e.g. an out of sequence receipt, the result of the hash function calculation may result in the same index value but have a corresponding mismatch between the packet IDs. Further, when there is a mismatch between packet IDs, the negative comparison may result in different routing of the received packet as explained below.

If the packet IDs match, e.g. are equal, then the received packet is a fragment from the same fragmented data frame as that of the packet ID and target partition stored in the record corresponding to the calculated index. The received packet may then be sent to the target partition as in operation 407. However, if the packet IDs do not match, then the received packet may be from a different frame whose target partition is unknown. In this instance, VM 111 may for example send the received packet to all possible partitions, e.g. virtualized entities on VM host 110 to assure delivery to the proper destination (operation 410), or may deal with the packet in a different manner.

Other operations or series of operations may be used.

While the invention has been described with respect to a limited number of embodiments, it will be appreciated that many variations, modifications and other applications of the invention may be made. Embodiments of the invention may include a computer readable medium, such as for example a memory, a disk drive, or a USB or other flash memory, including instructions which when executed by a processor or controller, carry out methods disclosed herein. Embodiments of the present invention may also include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method comprising:
   receiving a fragment of a fragmented data frame, the fragmented data frame fragmented into a plurality of fragments, wherein every fragment of the fragmented data frame includes at least a header, the header including at least a packet identifier and a fragment offset, and a first fragment of the plurality of fragments further includes at least a port number, the port number associated with a target partition of a plurality of partitions;
   calculating from the packet identifier of the fragment a hash key for a location in a hash table;
   determining from the fragment offset if the fragment is the first fragment;
   if the fragment is the first fragment of the fragmented data frame, storing at the location in the hash table the packet identifier and the target partition;
   if the fragment is not the first fragment:
   retrieving from the location in the hash table the packet identifier and the target partition; if the fragment is not the first fragment and the packet identifier at the location in the hash table matches the packet identifier of the fragment, sending the fragment to the target partition; and if the fragment is not the first fragment and the packet identifier at the location in the hash table does not match the packet identifier of the fragment, sending the fragment to each of the plurality of partitions.

2. The method of claim 1, wherein the calculating of the hash key is based on the size of the hash table.

3. The method of claim 1, wherein the header is a Transmission Control Protocol header.

4. The method of claim 3, wherein the fragmented packet comprises an Internet Protocol packet.

5. The method of claim 1, wherein the partitions are virtual machines on a virtual machine host.

6. A device comprising:
   a virtual machine host device to host a plurality of partitions each having at least one unique port number associated therewith, the host device including at least:
   a first partition to receive a fragment of a fragmented data frame, the fragment data frame fragmented into a plurality of fragments, wherein every fragment of the fragmented data frame includes at least a header, the header including at least a packet identifier and a fragment offset, and the first fragment further includes at least a port number, the port number associated with a target partition of a plurality of partitions; to calculate from the packet identifier of the fragment a hash key for a location in a hash table; to determine from the fragment offset if the fragment is a first fragment; if the fragment is the first fragment of the fragmented packet, to store at the location in the hash table the packet identifier and the target partition; to, if the fragment is not the first fragment, retrieve from the location in the hash table the packet identifier and the target partition; to, if the fragment is not the first fragment and the packet identifier at the location in the hash table matches the packet identifier of the fragment, send the fragment to the target partition; and to, if the fragment is not the first fragment and the packet identifier at the location in the hash table does not match the packet identifier of the fragment, send the fragment to each of the plurality of partitions; and a second partition having a second port number associated therewith.

7. The device of claim 6, wherein the header is a Transmission Control Protocol header.

8. The device of claim 7, wherein the fragmented packet comprises an Internet Protocol packet.

9. The device of claim 6, wherein the partitions are virtual machines on the virtual machine host device.

* * * * *